(12) United States Patent
Kim et al.

(10) Patent No.: US 7,765,838 B2
(45) Date of Patent: Aug. 3, 2010

(54) TUB FOR WASHING MACHINE AND METHOD OF MANUFACTURING THE SAME

(75) Inventors: Young Ho Kim, Seoul (KR); Byoung Soo Je, Seoul (KR); Si Moon Jeon, Seoul (KR); Dong Won Kim, Kwangmyung-si (KR)

(73) Assignee: LG Electronics Inc., Seoul (KR)

(*) Notice: Subject to any disclaimer, the term of this patent is extended or adjusted under 35 U.S.C. 154(b) by 460 days.

(21) Appl. No.: 11/654,524

(22) Filed: Jan. 18, 2007

(65) Prior Publication Data

US 2007/0175245 A1    Aug. 2, 2007

(30) Foreign Application Priority Data

Jan. 27, 2006    (KR) .................. 10-2006-0009015

(51) Int. Cl.
*D06F 37/26* (2006.01)
(52) U.S. Cl. ........................................ 68/140
(58) Field of Classification Search .............. 68/24, 68/140
See application file for complete search history.

(56) References Cited

U.S. PATENT DOCUMENTS 2,611,257 A * 9/1952 Kahn ..................... 68/21
4,423,607 A * 1/1984 Munini .................. 68/23.2
2004/0163428 A1 * 8/2004 Kim et al. .............. 68/140

FOREIGN PATENT DOCUMENTS

| CN | 2414086 | 1/2001 |
|----|---------|--------|
| DE | 19603710 | 8/1997 |
| DE | 19756516 | 6/1999 |
| EP | 0219115 | 4/1987 |
| EP | 1538252 | 6/2005 |
| GB | 2272913 | 6/1994 |
| JP | 54118664 | 9/1979 |
| JP | 7068085 | 3/1995 |

OTHER PUBLICATIONS

European Search Report dated May 15, 2007.

* cited by examiner

*Primary Examiner*—Joseph L Perrin
(74) *Attorney, Agent, or Firm*—McKenna Long & Aldridge LLP

(57) ABSTRACT

A tub of a washing machine that prevents vibration and noise and a method of manufacturing the tub are provided. The tub includes a rear tub portion, a front tub portion located in front of the rear tub portion, and one or more linear reinforcing portions formed on at least one of the rear and front tub portions and extending in a direction parallel to a central axis of the front and rear tub portions.

7 Claims, 8 Drawing Sheets

TUB FOR WASHING MACHINE AND METHOD OF MANUFACTURING THE SAME

This application claims the benefit of the Korean Patent Application No. P2006-0009015, filed on Jan. 27, 2006, which is hereby incorporated by reference for all purposes as if fully set forth herein.

BACKGROUND OF THE INVENTION

1. Field of the Invention

The present invention relates to a tub for reserving washing water in a washing machine, and more particularly, to a tub that reduces noise generated during the operation of a drum-type washing machine in which the tub is arranged horizontally, and a method of manufacturing the tub.

2. Description of the Related Art

Generally, washing machines clean laundry by removing dirt from the laundry as the laundry rotates within a drum. Washing machines operate in a variety of methods. In recent years, a drum-type washing machine has been widely used. A drum-type washing machine includes a cabinet, a tub installed in the cabinet, and a drum rotatably installed in the tub.

The drum-type washing machines are classified into two types according to the power transmission method. That is, the first type is designed to transmit rotational force of a motor to the drum through a belt connecting a driving shaft of the motor to a central shaft of the drum. The second type is designed to directly transmit the driving force of the motor to the drum, in which the motor is directly mounted to the rear of the tub and a driving shaft of the motor is connected to a rear wall of the drum after passing through the tub. In the second type, the driving shaft of the motor transmits the rotational force of the motor to the drum through the driving shaft. Thus, vibration generated from the motor is transmitted together with the rotational force.

Vibration, including vibration generated from the motor and vibration generated while laundry is rotates within the drum, is then transmitted to the tub.

The vibration transmitted to the tub causes local resonance at various portions of the tub, which causes overall vibration of the tub. That is, portions of the tub amplify the vibration transmitted to the tub and cause the amount of noise produced by the tub to increase to an undesirable level.

Referring to FIG. 1, a vibration analysis was done using a related art tub and FIG. 1 visually depicts the vibration and noise produced by the tub. It can be clearly noted that each portion of the tub locally functions as a diaphragm when external vibration is applied to the tub. That is, when vibration having a predetermined frequency is applied to the tub, each portion of the tub amplifies the vibration thereby producing an undesirable amount of noise. This can be identified by the color changes of the local portions of the tub.

In order to solve the above problem in the related art, a sound insulation member encloses the outer circumference of the tub or the inner circumference of the cabinet disposed around the tub. However, the use of the sound insulation member increases the number of overall components in the washing machine. Furthermore, it is difficult to install the sound insulation member in the washing machine.

In addition, reinforcing ribs may be further installed on each portion of the tub where the vibration amplification may occur.

However, in order to form the reinforcing portion on each local portion, many mold pieces are required to manufacture the tub with the reinforcing ribs using plastic through an injection molding process. In this case, the size of the tub mold increases and a large capacity injection machine is required.

Therefore, the manufacturing cost increases, and thus it is difficult to actually employ this method.

SUMMARY OF THE INVENTION

Accordingly, the present invention is directed to a tub of a washing machine that substantially obviates one or more problems due to limitations and disadvantages of the related art.

An advantage of the present invention is to provide a tub of a washing machine, in which a reinforcing portion having a proper structure is formed on an outer surface of the tub so that each portion of the tub that receives vibration does not amplify the vibration to produce unwanted noise.

Another advantage of the present invention is to provide a tub of a washing machine and a method of manufacturing the tub, in which the tub is provided with reinforcing portions but manufactured using a pre-existing mold, thereby reducing the cost for a new mold and manufacturing time.

Additional features and advantages of the invention will be set forth in the description which follows and in part will become apparent from the description, or may be learned by the practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, there is provided a tub of a washing machine including: a rear tub; a front tub located in front of the rear tub; and one or more linear reinforcing portions formed on at least one of the rear and front tubs and extending in a direction parallel to a central axis of the front and rear tubs.

In another aspect of the present invention, there is provided a washing machine, including: a tub including a rear tub having a body and a rear surface portion integrally formed with the body and provided with a motor shaft insertion hole and a front tub having a body coupled to a front portion of the rear tub; wherein one or more linear reinforcing portions are provided on an outer circumference of the bodies of the front and rear tubs; and a motor coupled to the rear surface portion and having a driving shaft penetrating the motor shaft insertion hole.

In still another aspect of the present invention, there is provided a method of manufacturing a tub including a rear tub having a body and a rear surface portion and a front tub connected to the rear tub, the method including: preparing a mold for forming at least one of the front and rear tubs, the mold having a longitudinal groove; forming a tub having a linear reinforcing portion corresponding to the longitudinal groove by injecting resin into the mold; and sliding the mold away from the tub in a direction parallel to the longitudinal groove.

It is to be understood that both the foregoing general description and the following detailed description of the present invention are exemplary and explanatory and should not be construed as limiting the scope of the claims.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
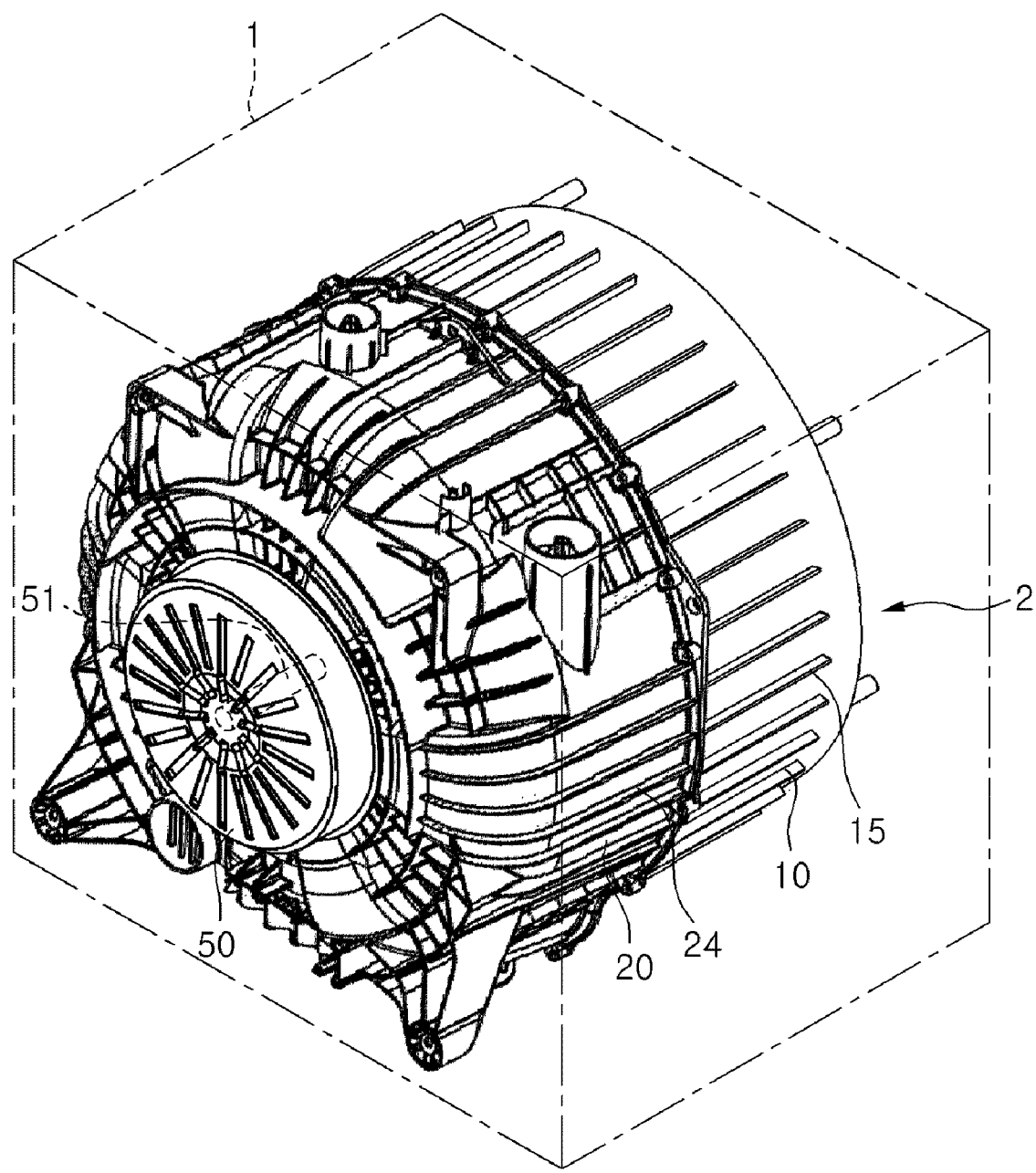
FIG. 2 is a perspective view of a tub according to an embodiment of the present invention.

Referring to FIG. 2, a tub 2 is disposed in a cabinet defining an outer appearance of a drum-type washing machine. The tub includes a front tub 10 disposed closest to a door (not shown) and a rear tub 20 disposed away from the door.

A motor 50 for rotating the drum (not shown) is fixed on a rear surface of the rear tub 20. The drum is disposed inside the tub 2 and is axially connected to the motor through a driving shaft 51 of the motor.

Side linear reinforcing portions 15 and 24 are formed on side surfaces of the front and rear tubs 10 and 20. The side linear reinforcing portions 15 and 24 extend in a direction parallel to the central axis of the tub 2. That is, the side linear reinforcing portions 15 and 24 extend in a direction in which a mold for manufacturing the tub 2 is removed from the tub 2. Accordingly, the side linear reinforcing portions 15 and 24 do not need a slide core or an inclination core. In order to form the side linear reinforcing portions 15 and 24, the previously used mold can be modified to include grooves to form the linear reinforcing portions 15 and 24. Therefore, no additional mold block is required For example, the side linear reinforcing portion 24 formed on the rear tub 20 can be formed by forming a groove on an inner circumference of an upper mold 61. Therefore, it can be manufactured by simply moving the mold 61 shown in FIG. 5 upward. In addition, the side linear reinforcing portion 15 formed on the front tub 10 can be formed by forming a groove on an inner circumference of the mold 71 shown in FIG. 8. That is, the tub with the side linear reinforcing portions can be formed by a sliding action of the mold 71. As described above, since the side linear reinforcing portions 15 and 24 extend in a direction where the molds 61 and 71 slide away from the tub, no additional mold block for side linear reinforcing portions 15 and 24 is required.

Figure 1:
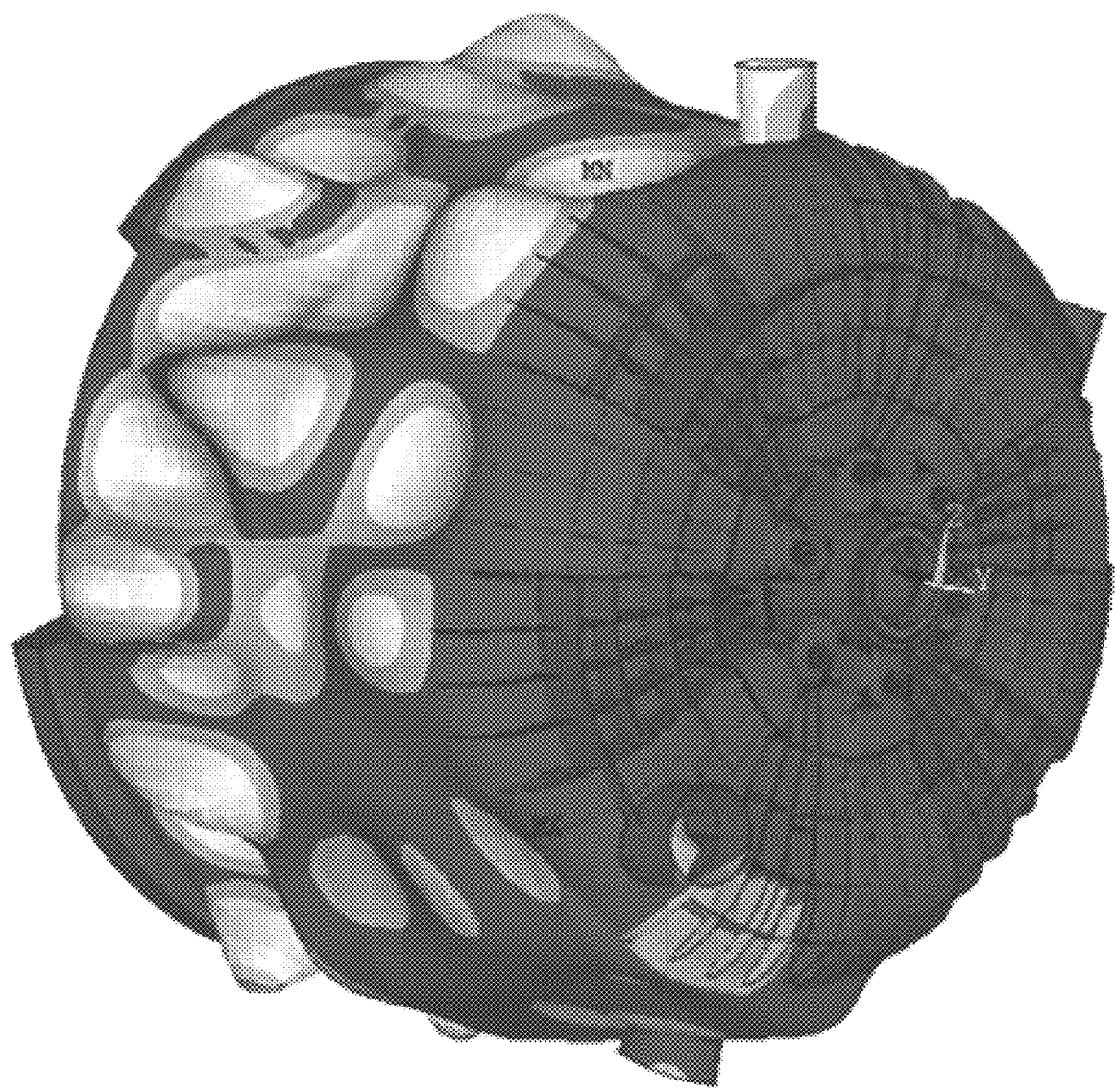
FIG. 1 is a view illustrating a vibration analysis of a related art tub.

As shown in FIG. 1, a large amount of vibration displacement is unevenly formed in a radial direction of the tub. With the addition of the side linear reinforcing portions 15 and 24 on the front and rear tubs 10 and 20, respectively, the overall strength of the tub 2 is increased while the moment of inertia is reduced. The portions of the tub 2 that previously functioned as a diaphragm in the related art due to the vibration displacement are eliminated. Thus, any vibration produced by the tub 2 is not amplified and the noise of the washing machine is reduced.

When the motor is directly fixed on a rear surface of the rear tub 2, a tub 2 including the side linear reinforcing portions 15 and 24 significantly reduces the vibration and noise produced by the tub 2 even when the amount of vibration transmitted to the tub 2 increases.

Figure 3:
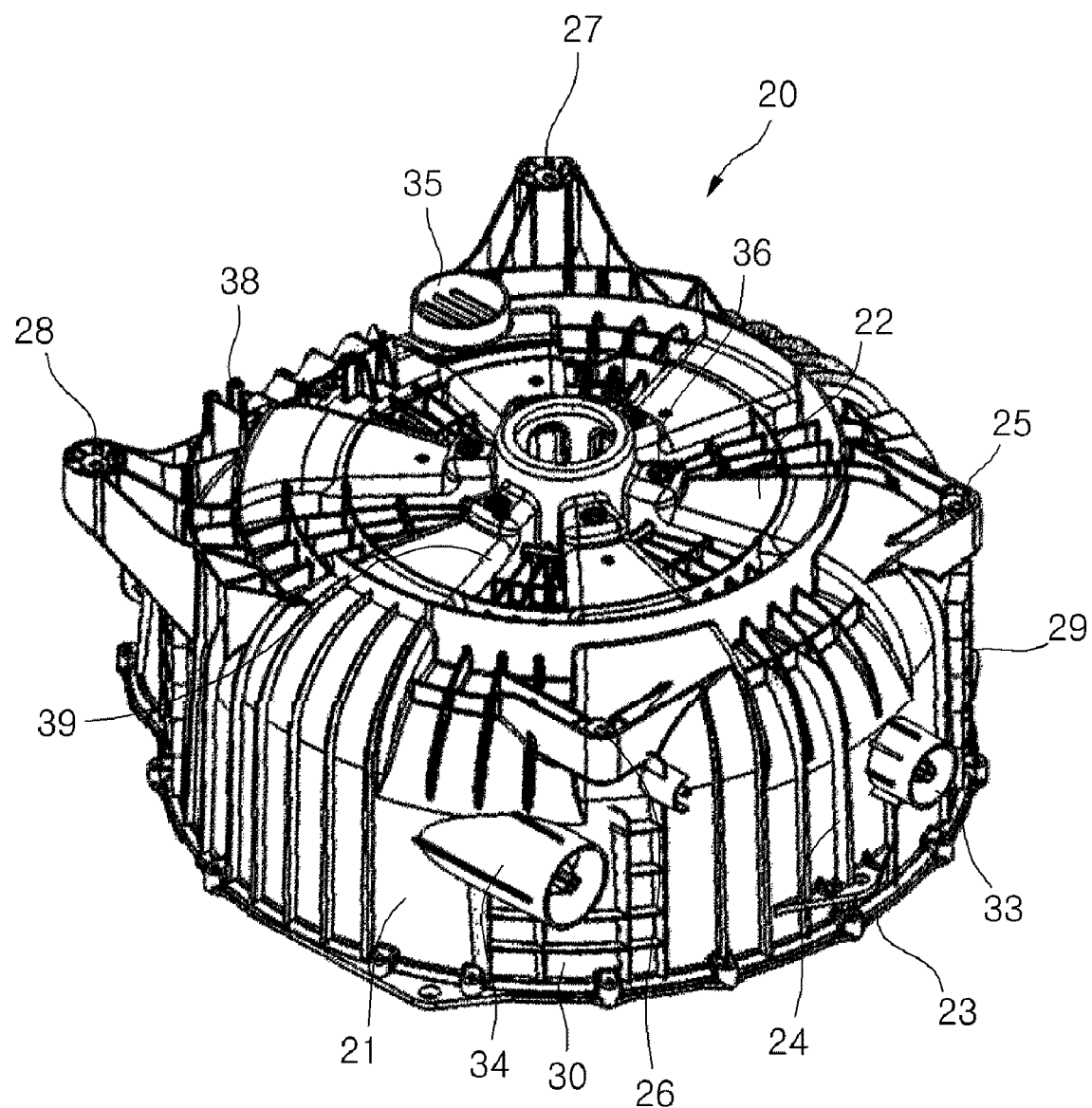
FIG. 3 is a front perspective view of a rear tub according to an embodiment of the present invention.
Figure 4:
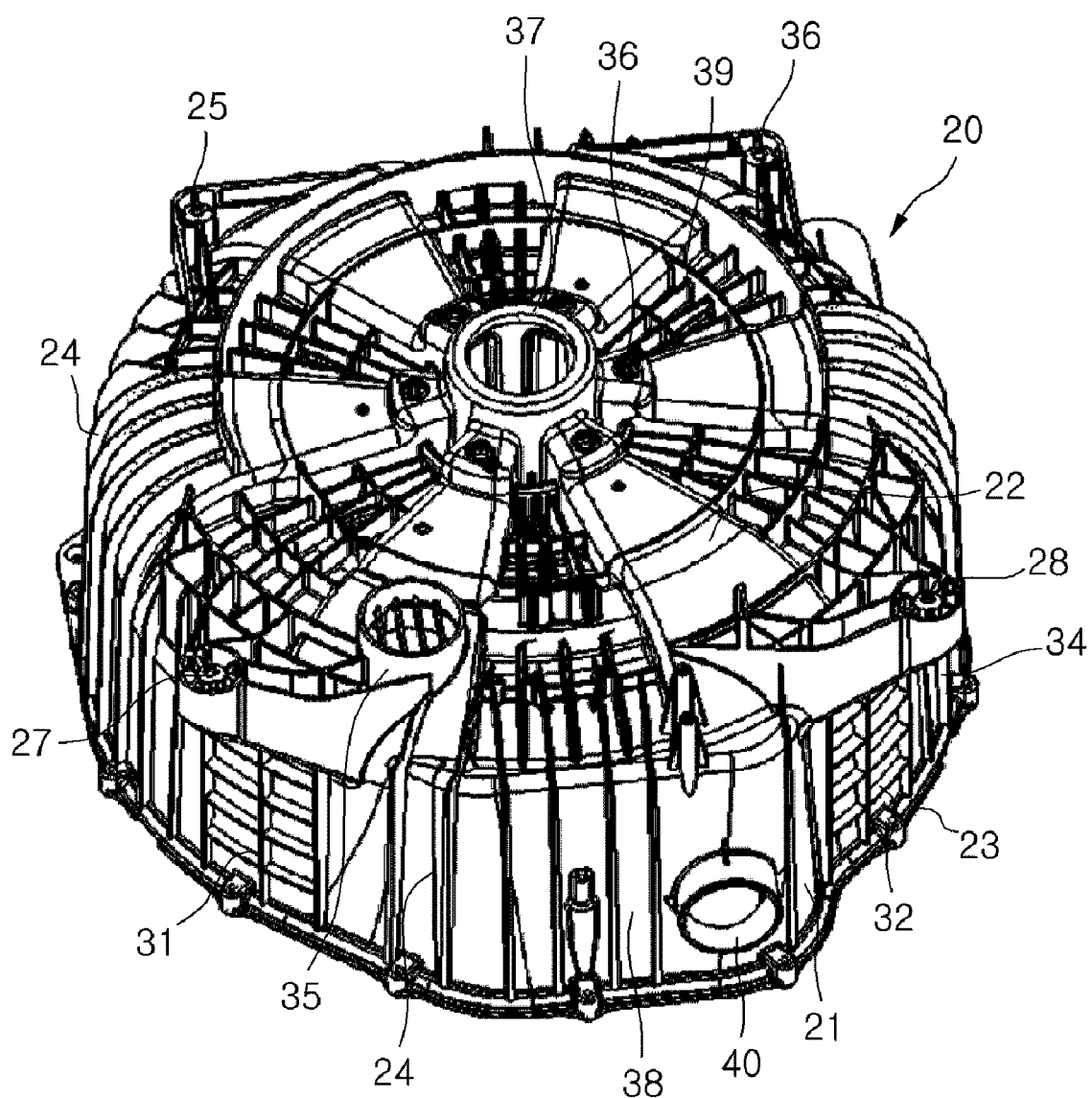
FIG. 4 is a rear perspective view of the rear tub of FIG. 3.

Referring to FIGS. 3 and 4, the rear tub 20 is generally formed in a cylindrical shape, including a rear tub body 21 and a rear surface portion 22 formed on a rear end of the rear tub body 21. A plurality of rear lattice reinforcing portions 39 are formed on the rear surface portion 22 to reinforce the strength of the rear surface portion 22 and the overall strength of the tub 2. The rear lattice reinforcing portions 39 may be separated by non-patterned portions of the rear surface 22 of the rear tub body 21 or the rear lattice reinforcing portions 39 may pattern the entire the rear surface portion 22.

The motor 50 is directly fixed on the rear surface portion 22 of the rear tub 20 through a motor fixing portion 36. The driving shaft 50 connects to the drum through a driving shaft supporting portion 37 which includes a motor shaft insertion hole formed in the rear tub 20. The motor fixing portion 36 and the driving shaft supporting portion 37 support the motor 50 and transmit the vibration generated from the motor 50 to the rear tub 20. Therefore, the amount of vibration and noise applied to the rear tub 20 is significantly increased. Particularly, when a bearing structure for supporting the driving shaft is integrally formed with the driving shaft supporting portion 37 because the vibration produced by the driving shaft 51 is directly transmitted to the rear tub 20.

During the spinning cycle of the washing machine, when moisture is removed from the laundry, the fluid flowing between the drum and the tub 2 collides with the inside of the tub 2. This also causes a further increase of the vibration and noise of the tub.

Since the side linear reinforcing portions 15 and 24 are formed on an outer circumference of the tub, the vibration transmitted to the tub 2 is not amplified but transmitted to a damper (not shown) supporting the tub 2. Therefore, the noise and vibration are further reduced.

Since the rear lattice reinforcing portions 39 are formed as the upper mold 61 slides out, no additional mold is required. While the rear lattice reinforcing portions 39 may function to reduce vibration, the major function of the rear lattice reinforcing portion 39 is to reinforce of the strength of the rear surface portion 22.

The rear surface portion 22 has first, second, third, and fourth cabinet coupling portions 25, 26, 27, and 28 formed at the rear surface portion 22. The cabinet coupling portions 25, 26, 27, 28 are provided to allow the rear tub 20 to be fixed within the cabinet 1 by, for example, screws.

Since the cabinet coupling portions 25, 26, 27, and 28 are provided with an undercut, they are not formed by using any additional inclination core in addition to the upper and lower molds 61 and 62.

By varying shapes of the inner surfaces of the inclination cores 63, 64, 65, and 66 (see FIG. 5) to form the cabinet coupling portions 25, 26, 27, 28 of the rear surface 22, it allows the lattice reinforcing portions 29, 30, 31, and 32 to be formed simultaneously on the outer circumference of the rear tub body 21 adjacent to the cabinet coupling portions 25, 26, 27, and 28. The lattice reinforcing portions 29, 30, 31, and 32 may also be formed using a different inclination core than the inclination cores 63, 64, 65, and 66 that form the cabinet coupling portions 25, 26, 27, 28.

When the lattice reinforcing portions 29, 30, 31, and 32 are provided, the reliability of the strength reinforcement increases and the noise and vibration produced by the tub are further reduced. However, when the lattice reinforcing portions are formed on an entire portion of the rear tub body 21, the mold structure becomes more complicated.

A first tub coupling portion 23 extending outward is further formed on a front end portion of the rear tub body 21. The first tub coupling portion 23 is aligned with the second tub coupling portion 14 of the front tub 10 so that the front and rear tubs 10 and 20 can be coupled together.

The rear tub 20 is further provided with communication structures including a hole 33 through which air flows in and out, a detergent dispensing hole 34 through which detergent and washing water is supplied, a drain hole 40 through which the washing water is drained, and a drying air inlet 35 through which drying air is introduced. These communication structures are well known in the art and a detailed description thereof will be omitted herein.

The side linear reinforcing portions 24 are formed on an entire surface of the rear tub body 21 and extend in an axial direction of the tub 2. Therefore, any portion of the rear tub 20 functioning as a diaphragm can be eliminated. In addition, since any vibration applied to the rear tub 20 is absorbed by the damper, no additional structure for reducing the vibration is required to be formed as part of the rear tub 20. Furthermore, since the strength of the rear tub 20 is reinforced by the side linear reinforcing portion 24, damage of the rear tub 20 can be prevented.

Figure 5:
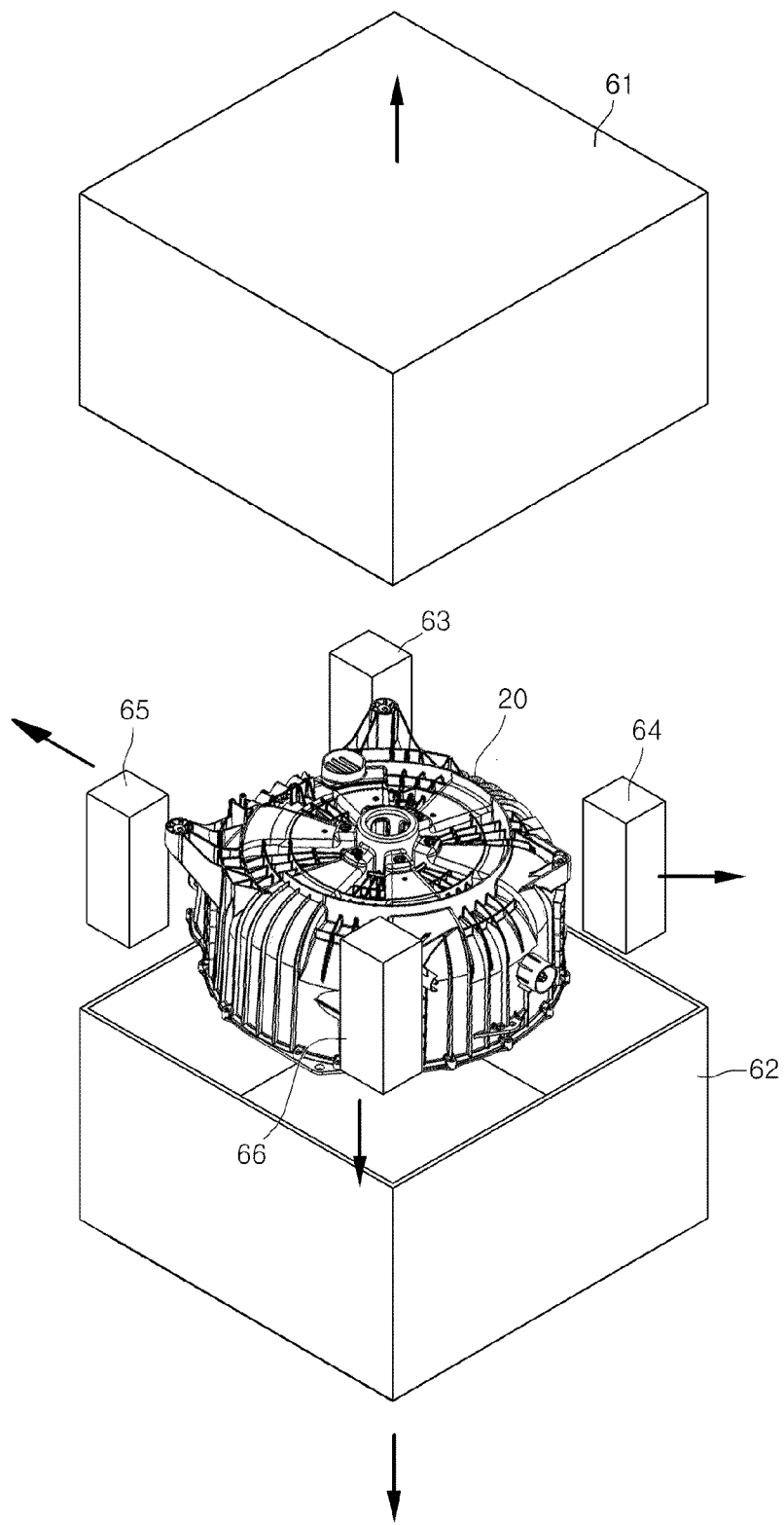
FIG. 5 is a view illustrating a mold for manufacturing a rear tub according to an embodiment of the present invention.

Referring to FIG. 5, the mold for manufacturing the rear tub 20 includes upper and lower molds 61 and 62 which form the rear tub 20 and inclination cores 63, 64, 65, and 66 form the cabinet coupling portions 25, 26, 27, and 28. In a state where the components of the mold are assembled, plastic resin is injected into the mold. Then, the upper and lower molds 61 and 62 slide away from the formed rear tub 20 in the axial direction of the rear tub 20 and the inclination cores 63, 64, 65, and 66 slide away in the inclined direction. The arrows in FIG. 5 indicate the directions in which the components of the mold slide away.

Since the side linear reinforcing portions 25 extend in a direction where the upper and lower mold 61 and 62 slide away, they can be formed by simply forming grooves on a mold. Furthermore, in order to prevent the reinforcing portions from being deformed during the sliding motion of the upper and lower molds 61 and 62, the side linear reinforcing portions 24 are designed to gradually reduce in a height and width at each end. By this structure, the deformation of the side linear reinforcing portion 24 can be prevented during the sliding motion of the molds.

The side lattice reinforcing portions 29, 30, 31, and 32 are formed by outward sliding motions of the inclination cores 63, 64, 65, and 66. Since the inclination cores are used to form the lattice, each shape of the lattice can be finely formed. Furthermore, in order to prevent the side lattice reinforcing portions 29, 30, 31, and 32 from being deformed during the molding process, the width of the lattice portions gradually reduce in the direction in which the mold slides away from the tub.

The mold shown in FIG. 5 includes the upper and lower molds 61 and 62 and the inclination cores 63, 64, 65, and 66 to maintain the circular shape of the rear tub 20. Inclination cores do not form the side linear reinforcing portions 24. That is, in order to form the side linear reinforcing portions 24, the grooves are simply formed on the inner surface of the upper mold 61. Therefore, the mold according to an embodiment of the present invention is generally similar to a previously used mold structure while forming a structure for preventing the vibration and noise of the rear tub 20.

However, it cannot be regarded that the side linear reinforcing portions 24 have been realized through a simple design change of the mold. That is, the side linear reinforcing portions 24 result from the research and development based on the vibration introduced to the tub and the structure of the mold to manufacture the tub. Namely, the side linear reinforcing portions 24 are formed to reduce the vibration and noise while still making the mold simple, small in size, and inexpensive.

Figure 6:
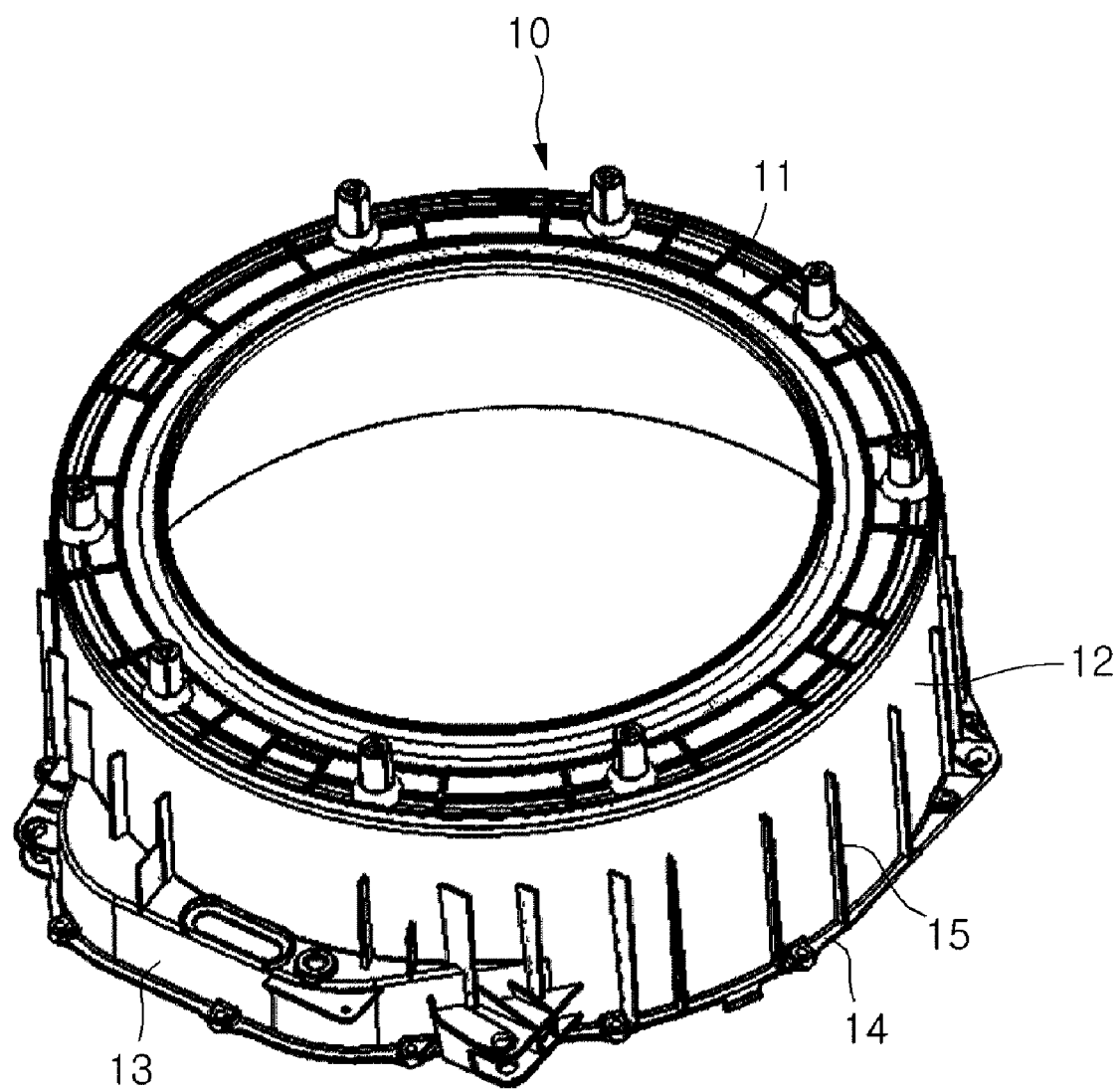
FIG. 6 is a front perspective view of a front tub according to an embodiment of the present invention.
Figure 7:
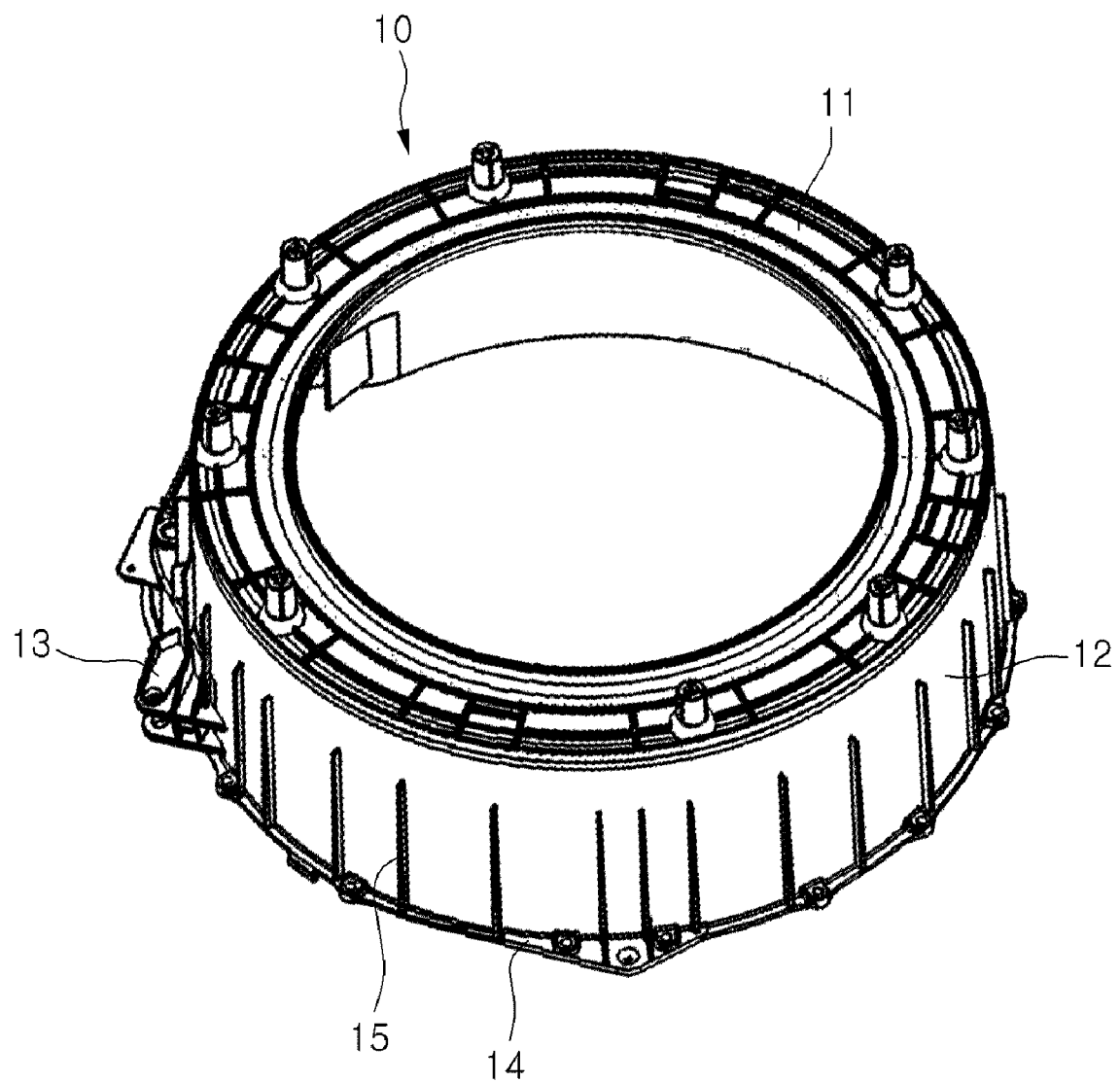
FIG. 7 is a rear perspective view of the front tub of FIG. 6.

Referring to FIGS. 6 and 7, the front tub 20 is formed in a cylindrical shape, including a front tub body 12 and a front tub front portion 11 through which the laundry is loaded.

The side linear reinforcing portions 15 are formed on an entire surface of the front tub body 12 and extend in a sliding direction of the mold. Therefore, any portion of the front tub 20 functioning as a diaphragm is eliminated from the front tub 20. That is, the local resonance in the front tub 10 can be reduced, thereby preventing unwanted vibration and noise. In addition, any vibration applied to the front tub 10 is transmitted through the side linear reinforcing portions 15 and absorbed by the damper.

The front tub 10 is provided with a second tub coupling portion 14 aligned with the first tub coupling portion 23 so that the front and rear tubs 10 and 20 can be coupled together. A front tub side support 13 is formed on the front tub 10 in an aligning direction with the rear tub support 38, thereby supporting a lower portion of the front tub 10.

Figure 8:
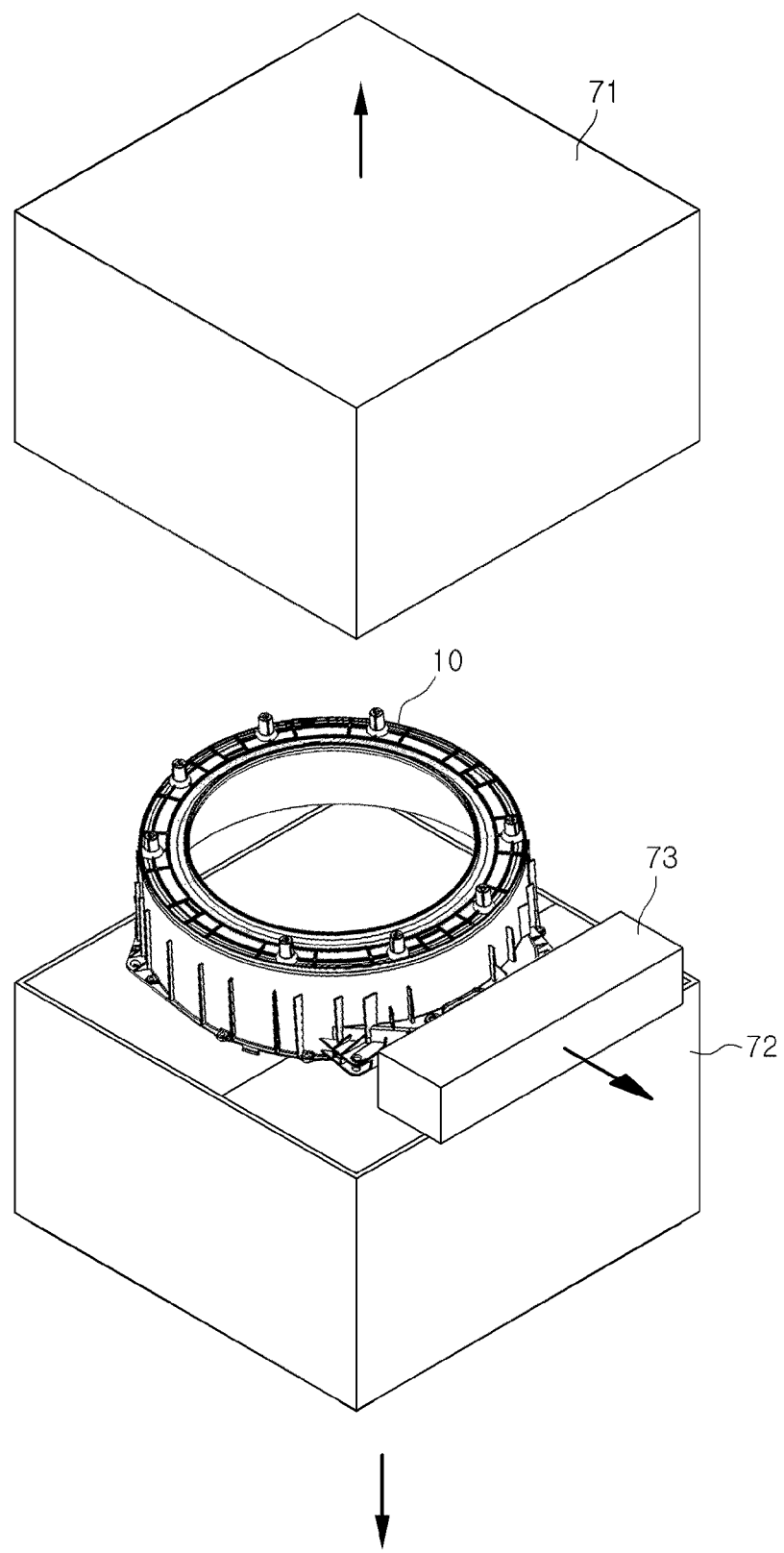
FIG. 8 is a view illustrating a mold for manufacturing a front tub according to an embodiment of the present invention.

Referring to FIG. 8, the mold for manufacturing the front tub 10 includes upper and lower molds 71 and 72 sliding in the axial direction of the tub 2, and a fifth inclination core 73 corresponding a support 13 where an undercut is generated. The arrows in FIG. 8 indicate the directions in which the upper and lower molds 71 and 72 and the fifth inclination core 73 slide away from the formed tub. The side linear reinforcing portions 15 extend in the same direction in which the upper mold 71 slides.

The mold shown in FIG. 8 includes the upper and lower molds 71 and 72 and the inclination core 73 to maintain the circular shape of the rear tub 20. This structure of the mold is not related to the forming of the side linear reinforcing portions 15. That is, in order to form the side linear reinforcing portions 15, the grooves are simply formed on the inner surface of the upper mold 71. The front tub 10 is manufactured through a process identical to that of the rear tub 20. Therefore, the mold of the present invention is generally identical to the related art mold structure while forming a structure for preventing the vibration and noise of the front tub 10.

The reduction in noise and vibration obtained by the side linear reinforcing portions of the tub can be more clearly understood with reference to the following table 1.

Table 1 shows an amount of noise generated from the tub when a vibration having a predetermined frequency is applied to the tub. The test was conducted under the condition where no load is applied to the drum and the condition where a 200 g load is applied to the drum.

TABLE 1

|  | RPM | Vibration (dB)_Related art | Vibration (dB)_Present Invention |
| --- | --- | --- | --- |
| No load | 1020 | 55 | 53.2 |
|  | 1150 | 57.6 | 55.6 |
|  | 1320 | 64.2 | 59.6 |

TABLE 1-continued

| | RPM | Vibration (dB)_Related art | Vibration (dB)_Present Invention |
|---|---|---|---|
| 200 g eccentric load | 1020 | 56.6 | 53.8 |
| | 1150 | 57.3 | 55.9 |
| | 1320 | 64.8 | 58.4 |

Referring to Table 1, the structure of the related art tub is substantially identical to that of the tub according to an embodiment of the present invention except that it does not have the side linear reinforcing portions 15 and 24.

Referring to the data of Table 1, it can be noted that the vibration and noise generated from the tub is significantly reduced by the side linear reinforcing portions.

It will be apparent to those skilled in the art that various modifications and variations can be made without departing from the spirit or scope of the invention. Thus, it is intended that the present invention cover the various modifications and variations provided they come within the scope of the appended claims and their equivalents.

For example, the lattice reinforcing portions are not limited to the lattice shape but may be formed in a variety of other shapes such as a circular shape or a dual shape having both of the circular and lattice shapes.

In addition, although the motor is directly fixed on the rear tub in the above embodiment, the motor may be separately disposed under the tub and connected to the drum by a connection member such as a belt.

In addition, although the side lattice reinforcing portions are formed by the same inclined cores providing a cabinet coupling portion, it is also possible to form the side lattice reinforcing portions by different the inclination cores.

It is also possible for the side linear reinforcing portions to be formed on only one of the front and rear tubes. It is also possible to employ a strength reinforcing member to a portion of the tub that does not function as a diaphragm in order to provide strength to the tub, such as a tube.

What is claimed is:

1. A washing machine, comprising:
a tub including:
a rear tub portion defining a cylindrically shaped body and a rear surface portion integrally formed with one end of the body, the rear surface portion having a motor shaft insertion hole in the center thereof;
a front tub portion coupled to the other end of the body of the rear tub portion;
one or more linear reinforcing portions formed on an outer circumference of the front tub portion;
one or more linear reinforcing portions formed on an outer circumference of the body of the rear tub portion, wherein the one or more linear reinforcing portions extend from the other end of the body to a predetermined points of the rear surface of the body;
one or more rear lattice reinforcing portions formed on the rear surface portion of the rear tub portion;
one or more side lattice reinforcing portions provided on the body of the rear tub portion; and
a motor directly coupled to the rear surface portion of the rear tub portion and having a driving shaft penetrating the motor shaft insertion hole,
wherein the rear lattice reinforcing portions and the linear reinforcing portions of the rear tub portion are alternately formed around the outer surface of the rear tub portion.

2. The washing machine according to claim 1, wherein the linear reinforcing portions of the rear tub portion are continuously connected to the reinforcing portions of the front tub portion.

3. The washing machine according to claim 1, wherein the linear reinforcing portions are configured to extend in a direction parallel to where a mold slides away from the tub.

4. The washing machine according to claim 3, wherein the linear reinforcing portion has a width and height that gradually reduces.

5. The washing machine according to claim 4, wherein the width and height gradually reduces in a direction parallel to the direction in which the mold slides away from the formed rear tub portion.

6. The washing machine according to claim 1, further comprising a damper, wherein the linear reinforcing portion transmits vibration to the damper.

7. The washing machine according to claim 1, wherein the linear reinforcing portions are arranged entirely on the outer circumference of the front and rear tub portions and spaced apart from each other.

* * * * *